United States Patent
Tracy

(10) Patent No.: US 11,864,678 B2
(45) Date of Patent: Jan. 9, 2024

(54) ARTICLE STORAGE AND RETREIVAL SYSTEM HAVING A ROLLER DOOR

(71) Applicant: GM Global Technology Operations LLC, Detroit, MI (US)

(72) Inventor: Adam Tracy, Irvine, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 139 days.

(21) Appl. No.: 17/690,905

(22) Filed: Mar. 9, 2022

(65) Prior Publication Data

US 2023/0284813 A1    Sep. 14, 2023

(51) Int. Cl.
A47G 29/14    (2006.01)
A47G 29/30    (2006.01)
B65G 13/02    (2006.01)

(52) U.S. Cl.
CPC .......... *A47G 29/141* (2013.01); *A47G 29/30* (2013.01); *B65G 13/02* (2013.01); *A47G 2029/145* (2013.01); *B65G 2201/0235* (2013.01)

(58) Field of Classification Search
CPC .................. A47G 29/141; A47G 29/30; A47G 2029/145; B65G 13/02; B65G 2201/0235
See application file for complete search history.

(56) References Cited

U.S. PATENT DOCUMENTS

| | | | | |
|---|---|---|---|---|
| 9,504,344 | B2* | 11/2016 | Sarvestani | A47G 29/1201 |
| 9,833,097 | B2* | 12/2017 | Byers | A47G 29/14 |
| 10,846,675 | B1* | 11/2020 | Smith | G07F 17/12 |
| 2004/0026445 | A1* | 2/2004 | Chirnomas | G07F 11/16 |
| | | | | 221/211 |
| 2019/0077597 | A1* | 3/2019 | Janwadkar | C07F 11/00 |
| 2021/0293465 | A1* | 9/2021 | Cartwright | G06Q 10/0832 |
| 2022/0084340 | A1* | 3/2022 | Hall | B60R 25/24 |

* cited by examiner

*Primary Examiner* — Mohamed Barakat
(74) *Attorney, Agent, or Firm* — CANTOR COLBURN LLP

(57) ABSTRACT

An article storage and retrieval system includes a body having a first side wall, a second side wall and a support surface. The support surface establishes a first article retrieval zone and a second article retrieval zone. A first door support assembly is arranged at the body. A second door support assembly arranged at the body. A roller door is mounted between the first door support assembly and the second door support assembly. The roller door includes an opening. A motor, operatively connected to one of the first door support assembly and the second door support assembly, selectively operates to shift the roller door relative to the body. A controller activates the motor to shift the roller door and selectively align the opening with one of the first article retrieval zone and the second article retrieval zone.

20 Claims, 6 Drawing Sheets

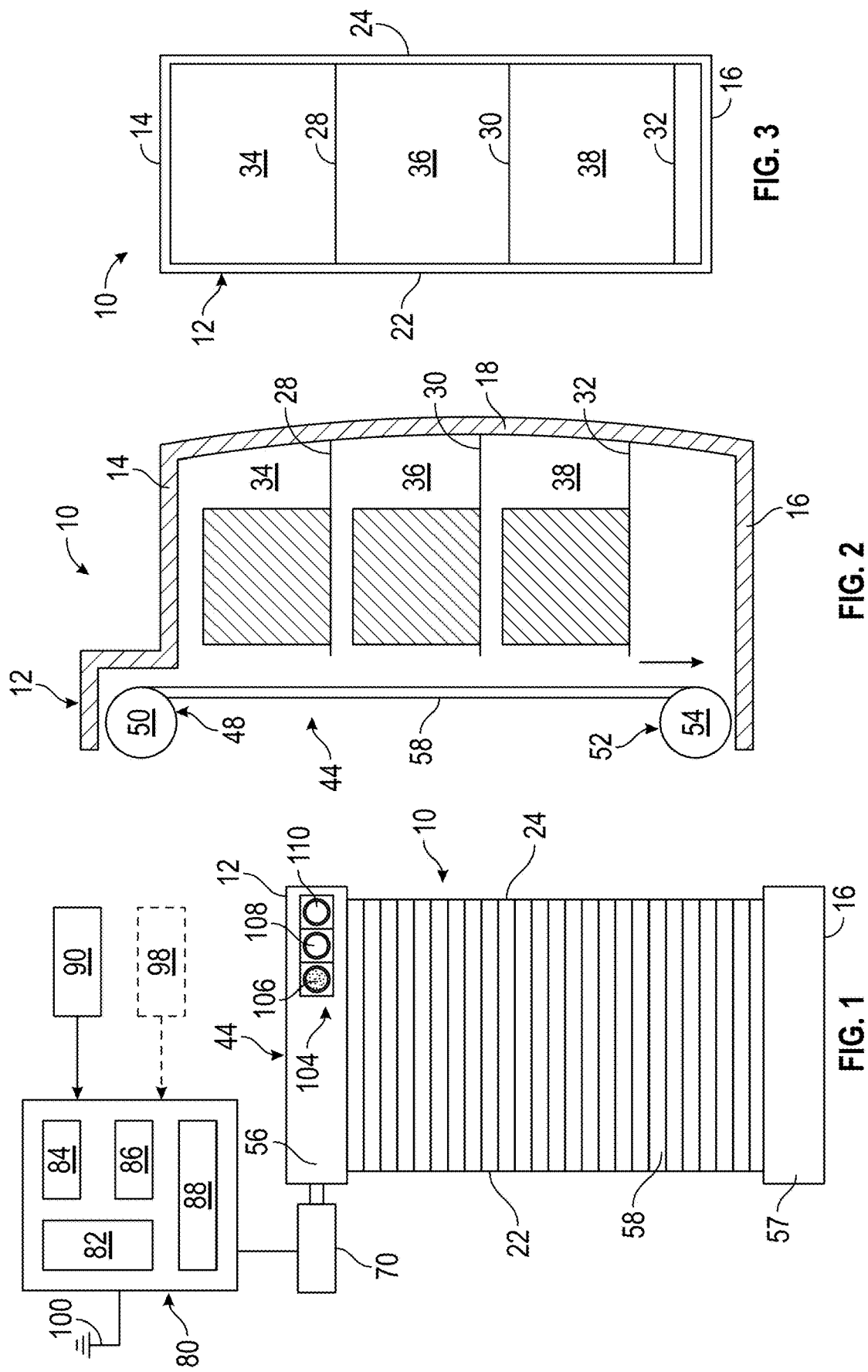

ARTICLE STORAGE AND RETREIVAL SYSTEM HAVING A ROLLER DOOR

INTRODUCTION

The subject disclosure relates to the art of storage and retrieval systems and, more particularly, to an article storage and retrieval system having a roller door.

The use of storage and retrieval systems for the safe delivery and acceptance of goods has grown in recent years. Package theft in certain areas is on the rise. As such, many consumers are taking advantage delivery hubs. A delivery hub is a secure location in which a storage and retrieval system may be positioned. The storage and retrieval system includes a number of different bays or cubby holes that are locked and accessible only by select personnel such as a delivery driver and a specific consumer. Instead of having a package delivered to a home or a place of business, the package is sent to the delivery hub.

Upon being shipped, the consumer is given notice of a proposed delivery date. When delivered, the consumer is sent a notice including information that allows access to, and retrieval of, the package. Typically, each of the different bays includes a secure door having a lock that may be accessed by a code. A delivery person may have a universal code that provides access to all of the storage bays while the consumer is given a code to access only the bay(s) that secure his or her package. While effective, delivery hubs are costly to build and maintain. Building and maintaining doors, locks, and the like is costly. Given that the number of delivery hubs is on the rise, the industry would welcome lower cost storage and retrieval options.

SUMMARY

Disclosed, in a non-limiting example, is an article storage and retrieval system including a body having a top wall, a bottom wall, a first side wall, a second side wall that is opposite to the first side wall, and a rear wall. A support surface extends between the first side wall and the second side wall spaced from the top wall and the bottom wall. The support surface establishes a first article retrieval zone and a second article retrieval zone. A first door support assembly is arranged at the body. A second door support assembly arranged at the body spaced from the first door support assembly. A roller door is mounted between the first door support assembly and the second door support assembly. The roller door includes an opening having a size that corresponds to each of the first article retrieval zone and the second article retrieval zone. A motor is operatively connected to at least one of the first door support assembly and the second door support assembly. The motor selectively operates to shift the roller door relative to the body. A controller is operatively connected to the motor. The controller activates the motor to shift the roller door and selectively align the opening with one of the first article retrieval zone and the second article retrieval zone.

In addition to one or more of the features described above or below, or as an alternative, further embodiments could include wherein the motor comprises a stepper motor.

In addition to one or more of the features described above or below, or as an alternative, further embodiments could include a sensor operatively connected to the controller, the sensor detecting a position of the opening relative to the body.

In addition to one or more of the features described above or below, or as an alternative, further embodiments could include signal elements operatively connected to the controller, the signal elements providing an operating status of the roller door.

In addition to one or more of the features described above or below, or as an alternative, further embodiments could include wherein the signal elements comprise indicator lights mounted to the body.

In addition to one or more of the features described above or below, or as an alternative, further embodiments could include wherein the roller door includes another opening sized to correspond to both of the first article retrieval zone and the second article retrieval zone.

In addition to one or more of the features described above or below, or as an alternative, further embodiments could include a user interface operatively connected to the controller, the user interface signaling the controller to operate in a first mode, wherein the motor shifts the roller door to align the opening with a selected one of the first article retrieval zone and the second article retrieval zone, and a second mode, wherein the motor shifts the roller door to selectively align the another opening with both of the first article retrieval zone and the second article retrieval zone.

In addition to one or more of the features described above or below, or as an alternative, further embodiments could include wherein the user interface comprises a keypad mounted to the body.

In addition to one or more of the features described above or below, or as an alternative, further embodiments could include wherein the user interface comprises one of a code scanner mounted to the body and a wireless communication system.

In addition to one or more of the features described above or below, or as an alternative, further embodiments could include wherein first door support assembly is mounted to the body at the top wall and the second door support assembly mounted to the body at the bottom wall.

In addition to one or more of the features described above or below, or as an alternative, further embodiments could include wherein the roller door includes a hatch arranged at the opening, the hatch being selectively pivotable relative to the roller door.

Also disclosed according to a non-limiting example, is a method of interfacing with an article storage and retrieval system including receiving a user identification input at a user interface, activating a motor to shift a roller door between a first door support assembly mounted to the article storage and retrieval system and a second door support assembly mounted to the article storage and retrieval system, and positioning an opening in the roller door at a selected one of a first article retrieval zone and a second article retrieval zone associated with the user identification input.

In addition to one or more of the features described above or below, or as an alternative, further embodiments could include wherein receiving the user identification input includes receiving a code associated with a particular user at a keypad.

In addition to one or more of the features described above or below, or as an alternative, further embodiments could include wherein receiving the user identification input includes receiving an image associated with a particular user through a code scanner associated with the article storage and retrieval system.

In addition to one or more of the features described above or below, or as an alternative, further embodiments could include wherein receiving the image includes scanning a bar code.

In addition to one or more of the features described above or below, or as an alternative, further embodiments could include wherein scanning the bar code includes scanning a bar code matrix.

In addition to one or more of the features described above or below, or as an alternative, further embodiments could include wherein receiving the user identification input includes receiving a wireless communication from a user.

In addition to one or more of the features described above or below, or as an alternative, further embodiments could include providing a visual indication of a status of the roller door to a user.

In addition to one or more of the features described above or below, or as an alternative, further embodiments could include wherein receiving the user identification input includes receiving an article delivery input.

In addition to one or more of the features described above or below, or as an alternative, further embodiments could include selectively positioning a loading opening at both of the first article retrieval zone and the second article retrieval zone upon receipt of the article delivery input.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 1 is a front plan view of the article storage and retrieval system including a roller door assembly, in accordance with a non-limiting example;

FIG. 2 is a cross-sectional side view of the article storage and retrieval system of FIG. 1, in accordance with a non-limiting example;

FIG. 3 is a front plan view of the article storage and retrieval system of FIG. 1 with the roller door assembly removed, in accordance with a non-limiting example;

DETAILED DESCRIPTION

Figure 4:
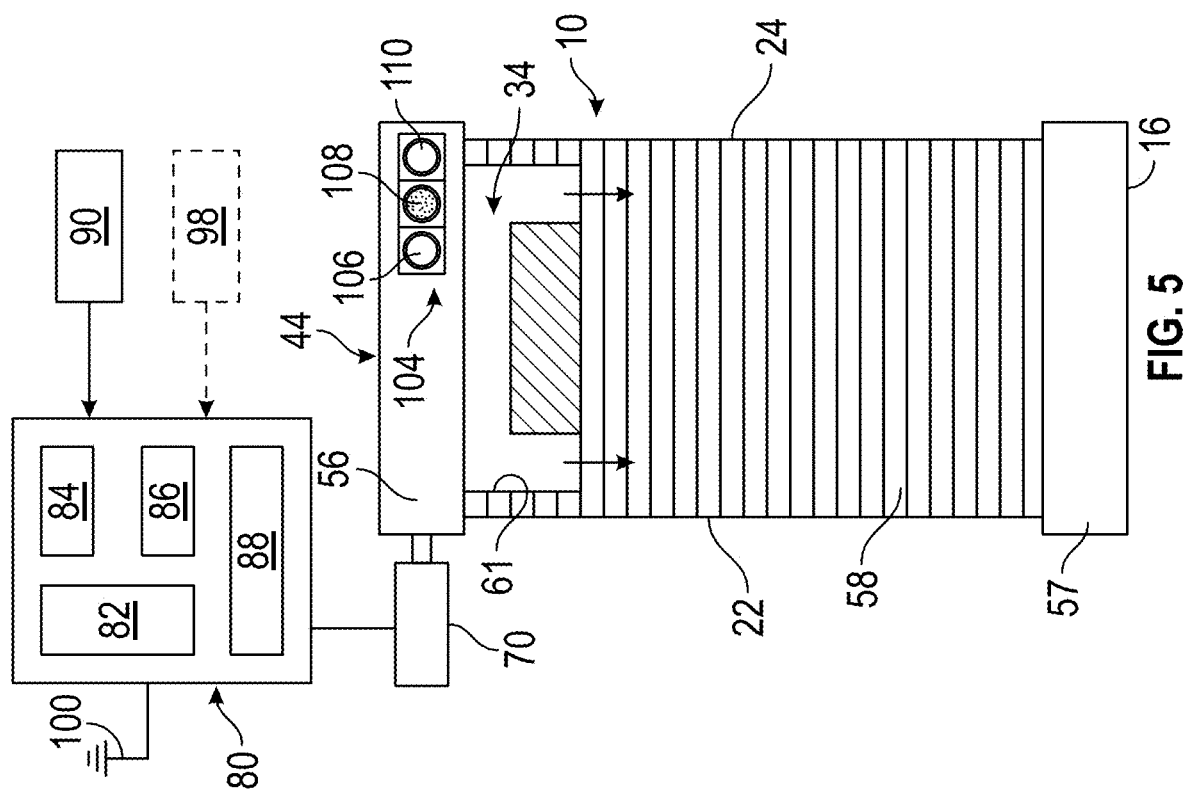
FIG. 4 is a front plan view of the article storage and retrieval system of FIG. 1 depicting the roller door assembly moving to an article retrieval position, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

An article storage and retrieval system, in accordance with a non-limiting example, is indicated generally at 10 in FIGS. 1 and 2. Article storage and retrieval system 10 includes a body 12 having a top wall 14, a bottom wall or base 16, and a rear wall or back 18. As shown in FIG. 3, body 12 further includes a first side wall 22 and a second side wall 24 that is opposite to first side wall 22. A first support surface 28 extends between first side wall 22 and second side wall 24 spaced from top wall 14. A second support surface 30 extends between first side wall 22 and second side wall 24 spaced from first support surface 28 toward bottom wall 16. A third support surface 32 is extends between first side wall 22 and second side wall 24. Third support surface 32 is arranged between second support surface 30 and bottom wall 16.

In a non-limiting example, top wall 14, rear wall 18 and first support surface 28 define a first article retrieval zone or cubby 34. First support surface 28, rear wall 18 and second support surface 30 defines a second article retrieval zone or cubby 36, and third support surface 32, rear wall 18 and second support surface 30 define a third article retrieval zone or cubby 38. In a non-limiting example, articles may be delivered to, and stored in, one or more of first, second, and third article retrieval zones 34, 36, and 38 for later retrieval by a consumer. That is, instead of home delivery, a consumer may have an article or articles delivered to article storage and retrieval system 10 as will be detailed herein.

In a non-limiting example, a roller door assembly 44 is mounted to body 12. Roller door assembly 44 operates to selectively expose one or more of first, second, and third article retrieval zones 34, 36, and 38 when accessed by a consumer or a delivery person as will be detailed herein. Roller door assembly 44 includes a first door support assembly 48 mounted at top wall 14. First door support assembly 48 includes a first roller 50. A second door support assembly 52 is mounted at bottom wall 16. Second door support assembly 52 includes a second roller 54. First door support assembly includes a first cover 56 and second door support assembly includes a second cover 57. A roller door 58 is supported by each of first roller 50 and second roller 54. While shown and described as being mounted at top wall 14 and bottom wall 16, first and second door support assemblies 48 and 52 may be mounted at various positions on body 12.

Figure 13:
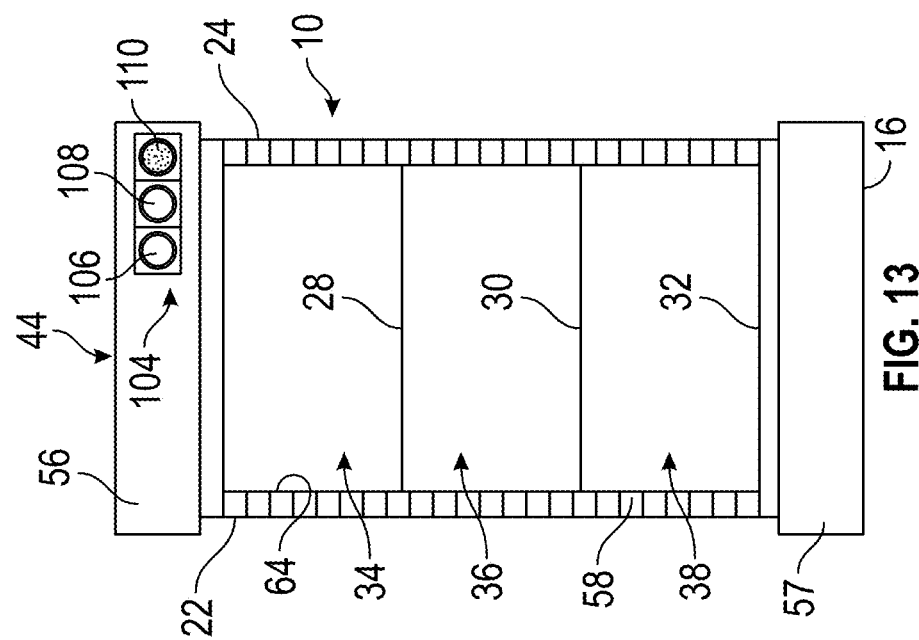
FIG. 13 depicts the article storage and retrieval system of FIG. 12 with the loading opening exposing the first article retrieval zone, the second article retrieval zone, and a third article retrieval zone.

In a non-limiting example, roller door 58 includes a first opening 61 (FIG. 5) and a second opening 64 (FIG. 13). First opening 61 includes a size that corresponds to one of first, second, and third article retrieval zones 34, 36, and 38. Second opening 64 includes a size that corresponds to all of first, second, and third article retrieval zones 34, 36, and 38 as will be detailed more fully herein. In a non-limiting example, a motor 70 is connected to first roller 50. Motor 70 may be operated to selectively shift roller door 58. In a non-limiting example, motor 70 may take the form of a stepper motor that is programmed to shift roller door 58 to align first opening 61 with one of first, second, and third article retrieval zones 34, 36, and 38 or align second opening 64 with all of first, second, and third article retrieval zones 34, 36, and 38.

In a non-limiting example, a controller 80 is connected to motor 70. Controller 80 operates motor 70 to selectively expose one or more of first, second, and third article retrieval zones 34, 36, and 38. In a non-limiting example, controller 80 includes a central processing unit (CPU) 82, a non-volatile memory 84, and a door control module 86. Controller 80 may also include a wireless control module 88. In a non-limiting example, controller 80 is connected to a user interface 90 that may take the form of a keypad, a code scanner, or the like.

Controller 80 may also be connected to an opening position sensor 98 that signals a relative position of first opening 61 and second opening 64 when a stepper motor is not used. Still further, controller 80 may include an antenna 100 that passes wireless signals to wireless control module 88 if so equipped. In a non-limiting example, roller door 58 may itself support sensors (not shown) that provide door status and or the position of first opening 61 and/or second opening 64 relative to body 12. Sensors mounted in roller door 58 could, in a non-limiting example, take the form of magnets, hall effect sensors, proximity sensors, and the like.

In a non-limiting example, article storage and retrieval system 10 may also include a signal member 104 that provides an operating status of roller door 58. That is, signal member 104 may indicate when roller door 58 is idle, when roller door 58 is moving to a selected position, and when roller door is at the selected position. For example, the selected position may be an article retrieval position such as when first opening 61 is aligned with one of first, second, and third article retrieval zones 34, 36, and 38 associated with a user or when roller door 58 is in an article delivery position such as when second opening 64 registers with all of first, second, and third article retrieval zones 34, 36, and 38. In a non-limiting example, signal member 104 may include a first signal element 106, a second signal element 108, and a third signal element 110. Signal elements 106, 108, and 110 may take the form of indicator lights. The indicator lights may include different colors.

In a non-limiting example, a user or consumer may have an article delivered to article storage and retrieval system 10. The article could be groceries, consumer goods, mail, or the like. Article storage and retrieval system 10 is typically located in a secure location. Further, in a non-limiting example, article storage and retrieval system may be mobile. That is, multiple users may request delivery to a particular location. Goods and such may be sent to a central article storage and delivery hub, article storage and retrieval system 10 may be loaded at the hub and then delivered to a central location convenient to the multiple users. For example, article storage and retrieval system 10 may be delivered to an office complex, an apartment building, or other secure location.

Once article storage and retrieval system 10 is loaded and at a select location, first signal element 106 may indicate a "ready to retrieve mode" is active. A user may approach user interface 90 and provide identifying information or article delivery input. The identifying information may take the form of a user identification such as an image, a code entered through the keypad, scanning a code through the code scanner, or sending a wireless signal an image of a code or the like. The code can be an alpha-numeric code, a numeric code, a bar code, a bar code matrix, or a wireless code. Once the code has been entered, it may be compared with codes in non-volatile memory 84 and verified. Once verified, controller 80 signals door control module 86 to activate motor 70 to begin moving roller door 58 as shown in FIG. 4.

Figure 5:
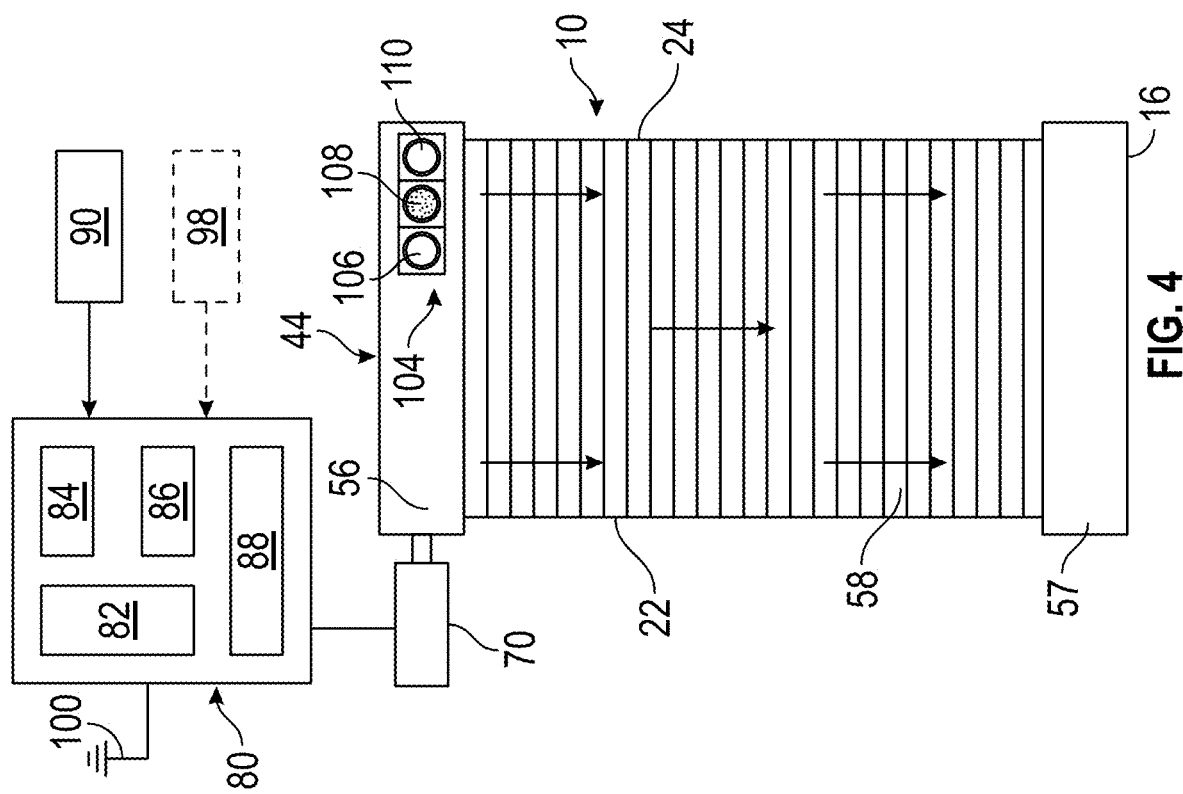
FIG. 5 is a front plan view of the article storage and retrieval system of FIG. 4 depicting the roller door assembly shifting an opening toward a first article retrieval zone.
Figure 7:
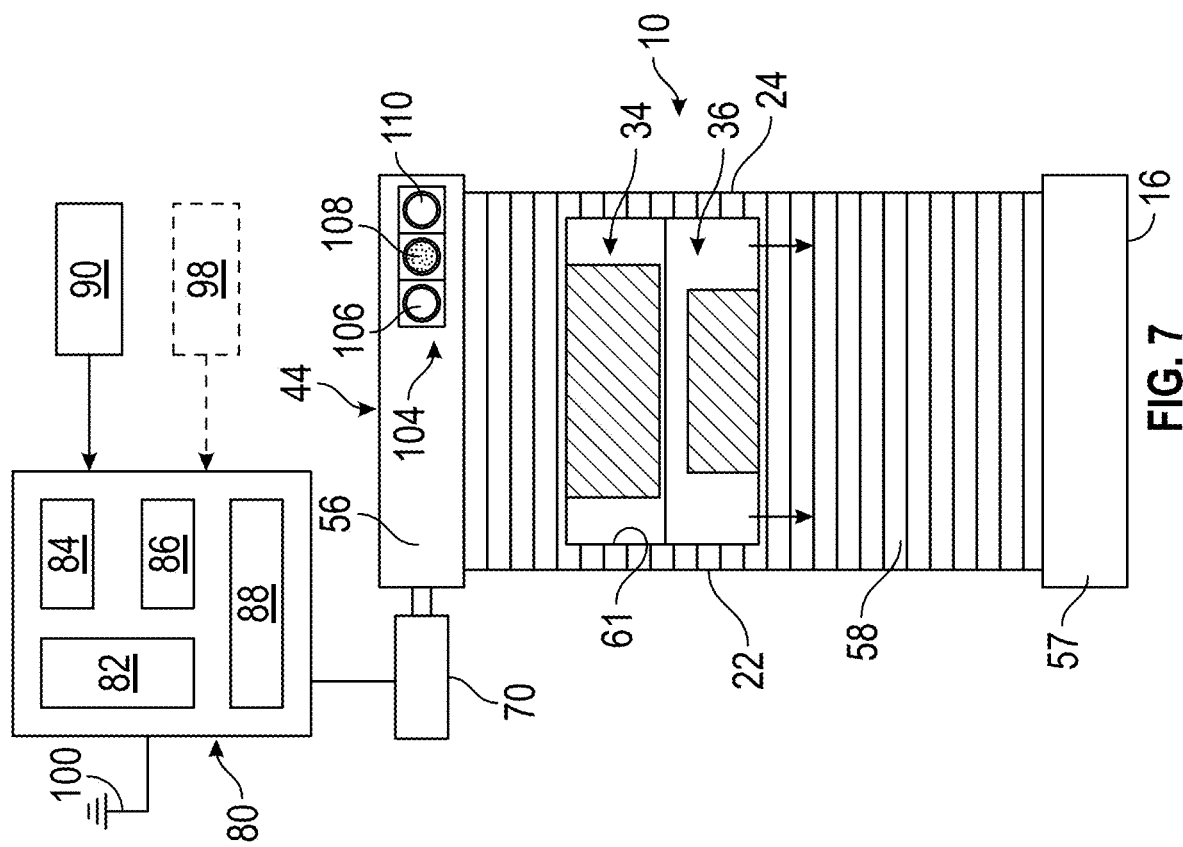
FIG. 7 is a front plan view of the article storage and retrieval system of FIG. 6 depicting the roller door assembly shifting the opening past the first article retrieval zone toward a second article retrieval zone.
Figure 6:
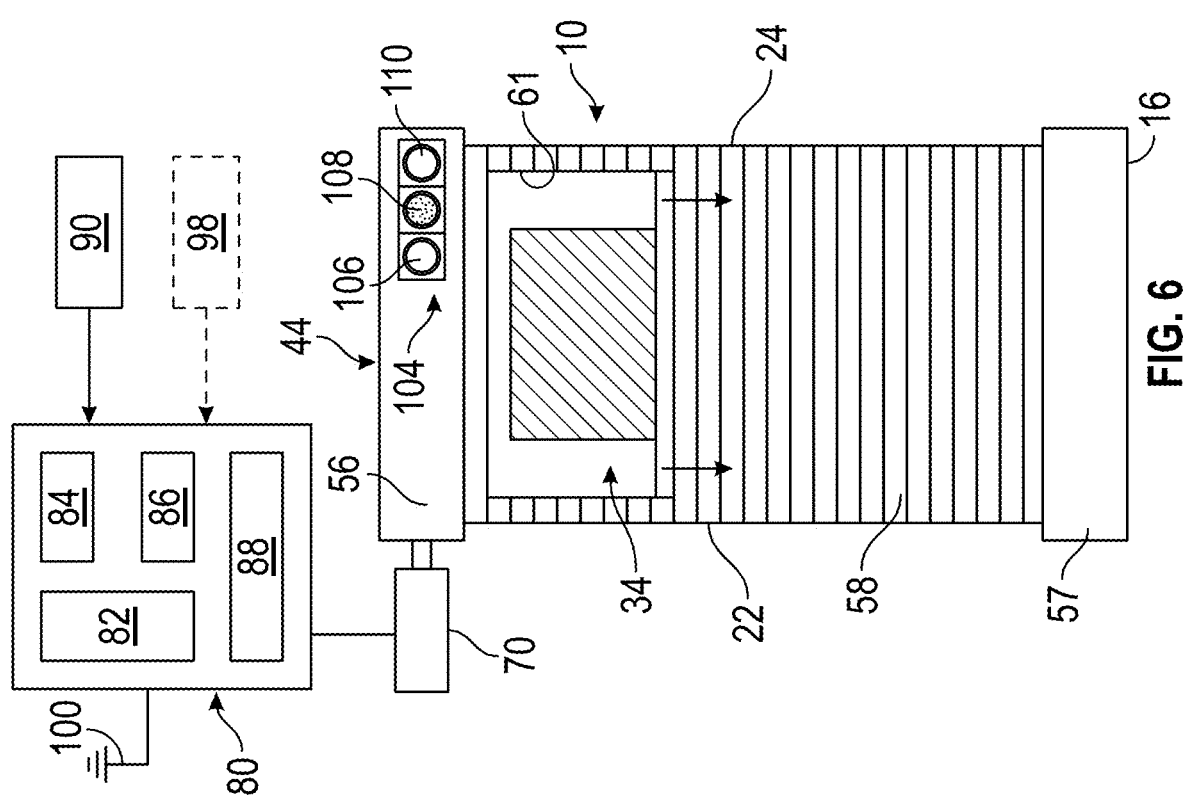
FIG. 6 is a front plan view of the article storage and retrieval system of FIG. 5 depicting the opening registered with the first article retrieval zone.
Figure 8:
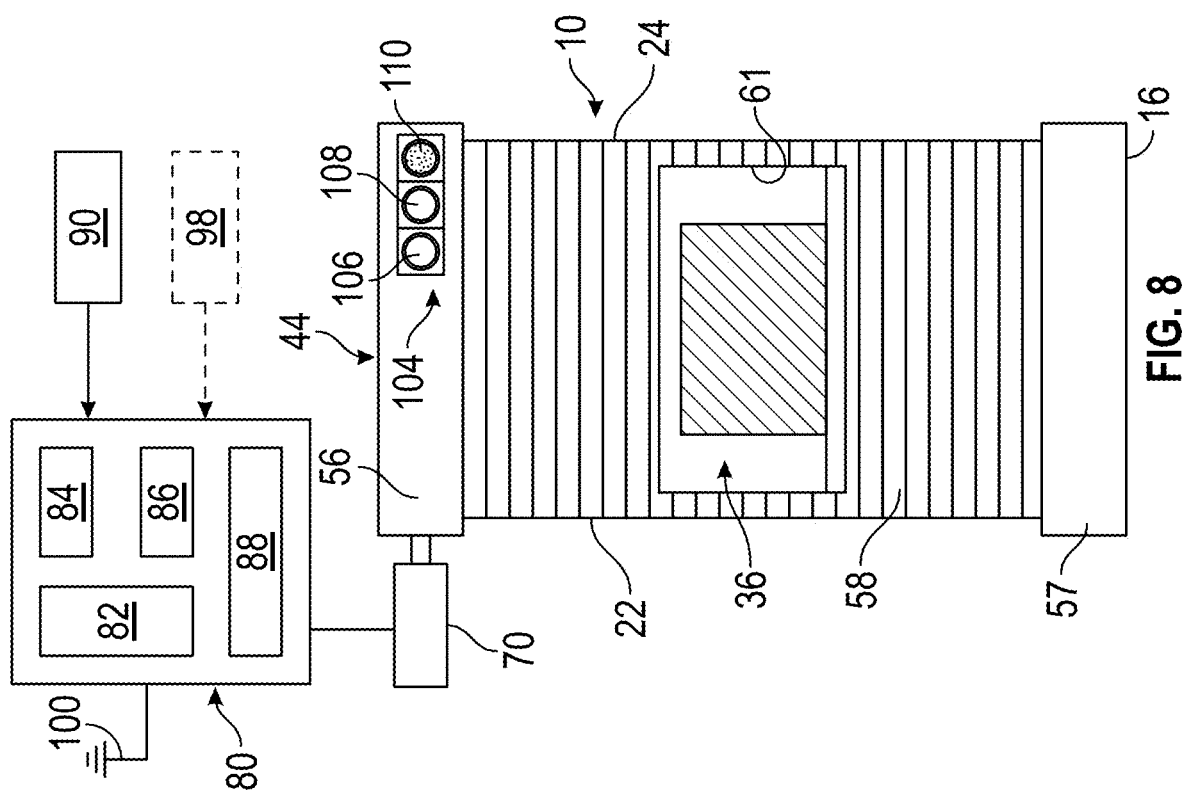
FIG. 8 is a front plan view of the article storage and retrieval system of FIG. 7 depicting the opening registered with the second article retrieval zone.

In an embodiment, door control module 86 is commanded to move first opening 61 to second article retrieval zone 36. Motor 70 may rely on internal controls to step roller door 58 past first article retrieval zone 34 as shown in FIGS. 5 and 6 to second article retrieval zone 36 as shown in FIG. 7. When first opening 61 registers with second article retrieval zone 36 and shown in FIG. 8, controller 80 stops motor 70. If a stepper motor is not employed, controller 80 may simply employ sensor(s) 98 to position first opening 61. As roller door 58 is in motion, second signal element 108 may be active. Once first opening 61 is registered with second article retrieval zone 36 and roller door 58 is stopped, third signal element 110 may be activated signaling that an article is ready for retrieval.

Figure 9:
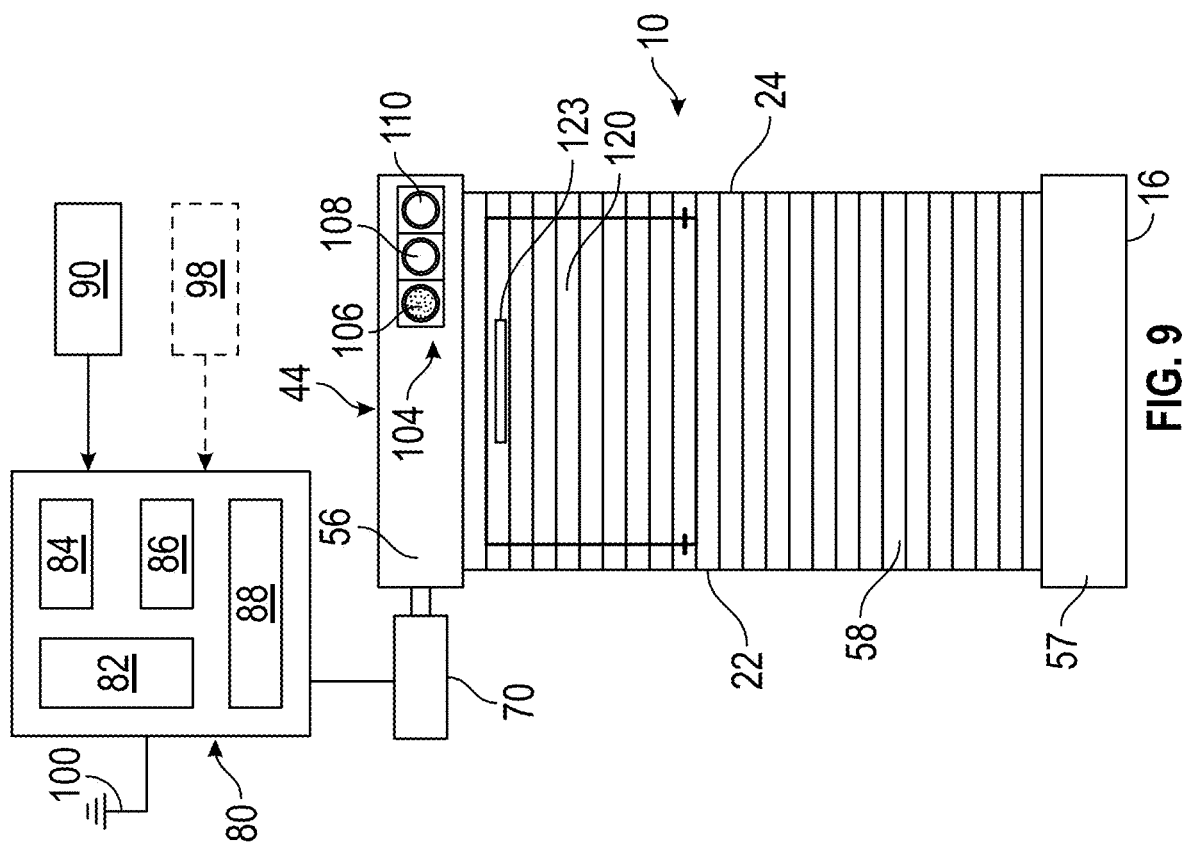
FIG. 9 is a front plan view of the article storage and retrieval system including a hatch provided in the door assembly, in accordance with a non-limiting example.
Figure 11:
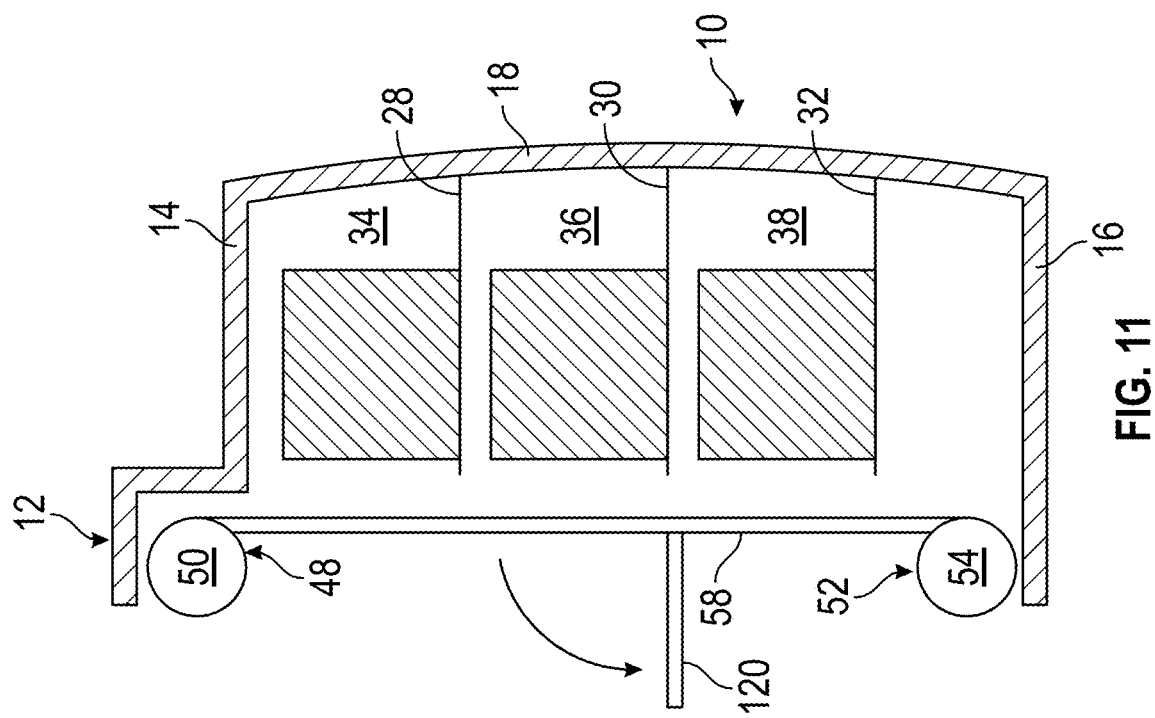
FIG. 11 depicts a cross-sectional side view of the article storage and retrieval system of FIG. 10, in accordance with a non-limiting example.
Figure 10:
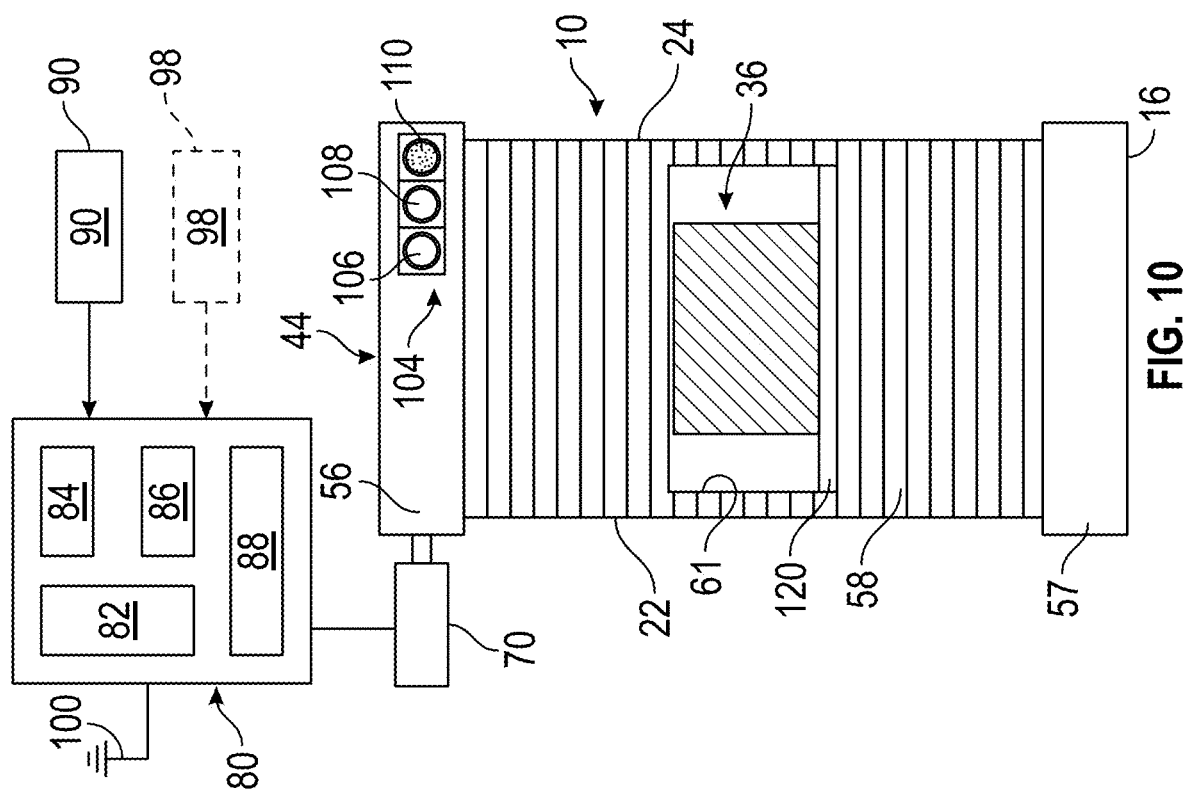
FIG. 10 is a front plan view of the article storage and retrieval system of FIG. 9 showing the hatch open at the second article retrieval zone, in accordance with a non-limiting example.

In one non-limiting example, once roller door 58 stops and third signal element 110 is illuminated, the user may retrieve the article from second article storage zone 36. The user may enter additional codes if more than one article is ready for pick up. Once article storage zone 36 is empty, controller 80 signals door control module 86 to return roller door 58 to a ready position (FIG. 1). In another non-limiting example such as shown in FIGS. 9-11, roller door 58 may include a hatch 120 having a latch 123. Hatch 120 remains closed such as shown in FIG. 9 until roller door 58 stops at, for example, second article storage zone 36 and third signal element 110 is illuminated. At this point, hatch 120 may be opened allowing the user to retrieve the article as shown in FIGS. 10 and 11.

Figure 12:
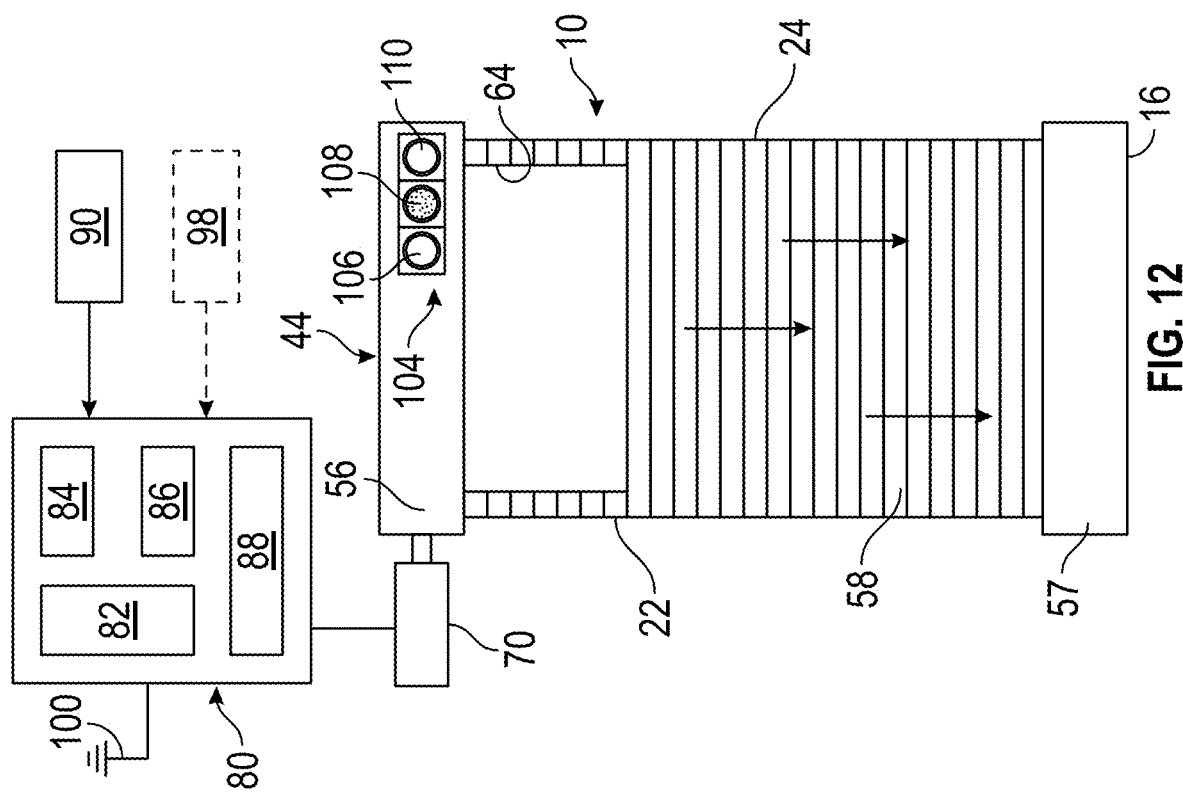
FIG. 12 depicts a front plan view of the article storage and retrieval system of FIG. 1 depicting a loading opening moving to expose the first article retrieval zone, the second article retrieval zone, and a third article retrieval zone.

In a non-limiting example, when articles are delivered to, or stand ready to be stored in, article storage and retrieval system 10, a user, such as a delivery person, a loading person, or the like, enters a user identification or code through user interface 90. The code is compared with codes stored in non-volatile memory 84. When confirmed, controller signals door control module 86 to shift roller door 58 such that second opening 64 registers with first, second, and third article retrieval zones 34, 36, and 38 as shown in FIGS. 12 and 13. When in position and third signal element 110 illuminates as shown in FIG. 13, articles may be loaded into one or more of first, second, and third article retrieval zones 34, 36, and 38. At this point, the delivery person or loader may update non-volatile member 84 with codes associated with each article and roller door 58 is returned to the ready position (FIG. 1). A consumer may then retrieve his/her article from the article retrieval zone upon entering a user identification input.

At this point, it should be understood that the article storage and retrieval system described in accordance with non-limiting examples represents a low maintenance system that can be installed and/or transported to a variety of locations. The use of a roller door with an opening reduces moving parts associated with similar units having multiple doors and locks associated with each door. Further, while shown as a single unit, the article storage and retrieval system may be combined with additional units to expand article storage capacity.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An article storage and retrieval system comprising:
a body having a top wall, a bottom wall, a first side wall, a second side wall that is opposite to the first side wall, and a rear wall;
a support surface extends between the first side wall and the second side wall spaced from the top wall and the bottom wall, the support surface establishing a first article retrieval zone and a second article retrieval zone;
a first door support assembly arranged at the body;
a second door support assembly arranged at the body spaced from the first door support assembly;
a roller door mounted between the first door support assembly and the second door support assembly, the roller door including an opening having a size that corresponds to each of the first article retrieval zone and the second article retrieval zone;
a motor operatively connected to one of the first door support assembly and the second door support assembly, the motor selectively operating to shift the roller door relative to the body; and
a controller operatively connected to the motor, the controller activating the motor to shift the roller door and selectively align the opening with one of the first article retrieval zone and the second article retrieval zone.

2. The article storage and retrieval system according to claim 1, wherein the motor comprises a stepper motor.

3. The article storage and retrieval system according to claim 1, further comprising a sensor operatively connected to the controller, the sensor detecting a position of the opening relative to the body.

4. The article storage and retrieval system according to claim 1, further comprising signal elements operatively connected to the controller, the signal elements providing an operating status of the roller door.

5. The article storage and retrieval system according to claim 4, wherein the signal elements comprise indicator lights mounted to the body.

6. The article storage and retrieval system according to claim 1, wherein the roller door includes another opening sized to correspond to both of the first article retrieval zone and the second article retrieval zone.

7. The article storage and retrieval system according to claim 6, further comprising a user interface operatively connected to the controller, the user interface signaling the controller to operate in a first mode, wherein the motor shifts the roller door to align the opening with a selected one of the first article retrieval zone and the second article retrieval zone, and a second mode, wherein the motor shifts the roller door to selectively align the another opening with both of the first article retrieval zone and the second article retrieval zone.

8. The article storage and retrieval system according to claim 7, wherein the user interface comprises a keypad mounted to the body.

9. The article storage and retrieval system according to claim 7, wherein the user interface comprises one of a code scanner mounted to the body and a wireless communication system.

10. The article storage and retrieval system according to claim 1, wherein first door support assembly is mounted to the body at the top wall and the second door support assembly is mounted to the body at the bottom wall.

11. The article storage and retrieval system according to claim 1, wherein the roller door includes a hatch arranged at the opening, the hatch being selectively pivotable relative to the roller door.

12. A method of interfacing with an article storage and retrieval system comprising:
receiving a user identification input at a user interface;
activating a motor to shift a roller door between a first door support assembly mounted to the article storage and retrieval system and a second door support assembly mounted to the article storage and retrieval system; and
positioning an opening in the roller door at a selected one of a first article retrieval zone and a second article retrieval zone associated with the user identification input.

13. The method according to claim 12, wherein receiving the user identification input includes receiving a code associated with a particular user at a keypad.

14. The method according to claim 13, wherein receiving the user identification input includes receiving an image associated with a particular user through a code scanner associated with the article storage and retrieval system.

15. The method according to claim 14, wherein receiving the image includes scanning a bar code.

16. The method according to claim 15, wherein scanning the bar code includes scanning a bar code matrix.

17. The method of claim 12, wherein receiving the user identification input includes receiving a wireless communication from a user.

18. The method of claim 12, further comprising providing a visual indication of a status of the roller door to a user.

19. The method of claim 12, wherein receiving the user identification input includes receiving an article delivery input.

20. The method according to claim 19, further comprising selectively positioning a loading opening at both of the first article retrieval zone and the second article retrieval zone upon receipt of the article delivery input.

* * * * *